United States Patent
Vetrini

(10) Patent No.: US 11,143,884 B2
(45) Date of Patent: Oct. 12, 2021

(54) PROCESS FOR REALIZING A THIN LENS AND THIN LENS

(71) Applicant: Barberini S.p.A., Pescara (IT)

(72) Inventor: Gianni Vetrini, Pescara (IT)

(73) Assignee: Barberini S.p.A., Pescara (IT)

( * ) Notice: Subject to any disclaimer, the term of this patent is extended or adjusted under 35 U.S.C. 154(b) by 0 days.

(21) Appl. No.: 16/080,018

(22) PCT Filed: Feb. 9, 2017

(86) PCT No.: PCT/IT2017/000025
§ 371 (c)(1),
(2) Date: Aug. 27, 2018

(87) PCT Pub. No.: WO2017/145186
PCT Pub. Date: Aug. 31, 2017

(65) Prior Publication Data
US 2019/0064540 A1    Feb. 28, 2019

(30) Foreign Application Priority Data
Feb. 26, 2016    (IT) .......................... 102016000020311

(51) Int. Cl.
*G02C 7/02*    (2006.01)
*G02B 1/04*    (2006.01)
(Continued)

(52) U.S. Cl.
CPC ............ *G02C 7/022* (2013.01); *G02B 1/041* (2013.01); *G02C 7/04* (2013.01); *G02C 7/12* (2013.01); *G02C 2202/16* (2013.01)

(58) Field of Classification Search
CPC .. B29D 11/00403; G02C 7/022; G02C 1/041; G02C 7/04; G02C 7/12; G02B 1/041
See application file for complete search history.

(56) References Cited

U.S. PATENT DOCUMENTS 5,702,813 A    12/1997 Murata et al.
5,751,481 A    5/1998 Dalzell et al.
(Continued)

FOREIGN PATENT DOCUMENTS

WO    WO 86/02742    5/1986
WO    WO 2017/145186    8/2017

OTHER PUBLICATIONS

Rapporto di Ricerca e Opinione Scritta [Search Report and Written Opinion] dated Nov. 10, 2016 From the Ministero Dello Sviluppo Economico, Direzione Generale Sviluppo Produttivo e Competitivita, Ufficio Italiano Brevetti e Marchi Re. Application No. ITUB20161120. (8 Pages).

(Continued)

*Primary Examiner* — Mathieu D Vargot

(57) ABSTRACT

The present invention concerns a method for making a thin lens and thin lens (1),
said method being characterized in providing the following subsequent steps:
a) taking a lens comprising a first optical layer (2), having a first surface (21) and a second surface (22) opposite to the first (21), a second optical layer (3), having a first surface (32) and a second surface (31) opposite to the first (32), and a third layer (4) interposed between said first (2) and second (3) optical layers in correspondence of the respective second surfaces (22, 31), said layers (2, 3, 4) being integrally coupled among each other;
b) working the first surface (32; 21) of one (3; 2) of said optical layers (2, 3) for reducing its thickness.
Furthermore, the present invention relates to a thin lens (1).

17 Claims, 2 Drawing Sheets

(51) Int. Cl.
    *G02C 7/04*           (2006.01)
    *G02C 7/12*           (2006.01)

(56) References Cited

U.S. PATENT DOCUMENTS

| | | |
|---|---|---|
| 6,231,183 B1 | 5/2001 | Dillon |
| 2004/0174493 A1* | 9/2004 | Chen ........................ G02C 7/02 351/159.62 |

OTHER PUBLICATIONS

International Search Report and the Written Opinion dated May 19, 2017 from the International Searching Authority Re. Application No. PCT/IT2017/000025. (12 pages).

* cited by examiner (Arte Nota)

PROCESS FOR REALIZING A THIN LENS AND THIN LENS

The present invention relates to a method for the realization of a thin lens, and a to a thin lens.

More precisely, the present invention is in the field of polarized glass thin lenses.

At the state of the glass lenses art, said lenses polarized by means of known processes, are realized by two thin glass optical caps or layers, typically about 0.85 to 1.2 mm thick, glued each other by the interposition of a PVA (Polyvinyl Alcohol) polarized film of about 30 microns.

The trend is to produce caps, having the same thickness, always more thin to reduce the weight of the final lens.

Thus, thin thicknesses also of 0.75-0.80 mm of the two glass caps have been obtained.

The final lens, after bonding, has a thickness reduced to about 1.8 mm (production standard) and even to between 1.6 to 1.7 mm. However, they have some drawbacks related to mechanical problems and/or problems related to light transmission.

The mechanical problems are related to the thin thickness of the lens. In fact, the lens in these thicknesses becomes elastic and deformable and during the surface working, tends to deform under the pressure of the tools working it and, if special techniques are not adopted, the surface is aberrated and the optical quality quickly expires. Once the two caps have been glued with the film, the resulting lens has significant aberrations if it is not worked with particular care and with long times.

Moreover, the shaping processing for profiling the lens on the frame model, is just as delicate and induces chipping that advice and force to adopt particularly low cutting speed.

It follows that the processing of lenses of these thicknesses is difficult and has the highest costs besides the addition of generating high production rejections.

Finally, it is necessary overcoming the impact resistance or Ball Drop Test (DBT), which is related to the resistant thickness of the lens.

The problems related to light transmission are mainly due to the fact that the polarized lenses for sunglasses are colored directly in the glass, to confer the typical colors and to filter the sunlight. Normally and as an average, the light passing through the lens is approximately 15-20% of the incident light. In other words, the lens absorbs 80-85% of the solar light. The above occurs at "standard" thickness, which is normally about 1.9-2.0 mm.

As said in the above, when reducing the thicknesses, the lens is proportionally less filtering and thus required transmission is not obtained, besides the progressive loss of color. To overcome these problems, sometimes it is necessary increasing the filtration on the polarized film to partly compensate for the loss of filtering power of the lenses. Otherwise, it is obtained by expensive coatings. Thus, problems occur with the repetition of the final lens color.

Moreover, new fusions are realized to generate darker glasses, and then adapted to the thickness reduction.

The above to obtain the filtering power with the reduction of the lens thickness.

Different is the situation when one of the caps is photochromic. In this case, the photochromic effect is related to the thickness of the lens, and when reducing the thickness of the photochromic cap, the transmission gap from the clear state to the dark state is not so high and is not appreciated by the market.

Finally, in the case in which the ultra-thin polarized lenses contain Rare Earths or Rare Earth (RE) further problems exist. Typically under this designation it is included, in the case of optical lenses, Neodymium (Ne), praseodymium (Pr) and erbium (Er). These chemical compounds, fused between the optical glass components, give the lens a selective filtering power at certain wavelengths. Substantially, the transmission curve has the selective filtrations to set sunlight wavelengths, i.e. at certain colors. In practice, some colors are attenuated to the view while other accordingly are exalted. It is obtained a desirable effect of improvement of color or color enhancement that has positive effects on the contrast of the colors. These special lenses are particularly appreciated by the market.

When producing ultra-thin lenses by glass containing RE, it is gradually lost the color enhancement effect, with the reduction of the thickness.

Even in this case, to solve this problem, it can be practiced the solution resorting to special fusions where the percentage of RE is increased influencing, more than proportionally, the cost of the blanks. Finally, it must also be increased the number of fusions (blanks) to have in stock with the consequent resulting costs for fixed assets.

Therefore, it is the object of the present invention to maintain and if possible to reduce the final thickness of the lens, for example to about 1.8 mm, improving the drawbacks and problems described in the above, in particular related to mechanical and optical problems of the obtained lenses.

It is an object of the present invention a method for making a thin lens and thin lens, said method being characterized in providing the following subsequent steps:

a) taking a lens comprising a first optical layer, having a first surface and a second surface opposite to the first one, a second optical layer, having a first surface and a second surface opposite to the first, and a third layer interposed between said first and second optical layers in correspondence of the respective second surfaces, said layers being integrally coupled among each other;

b) working the first surface of one of said optical layers for reducing its thickness.

Furthermore, according to the invention, said method can provide, after step b), the following step:

c) working the first surface of the other optical layer for reducing its thickness.

Still according to the invention, said method can provide that, during said step b), the thickness of said one optical layer is reduced in order to be less than 0.5 mm, preferably less than 0.3 mm.

Always according to the invention, said method can provide obtaining a thin lens having a thickness less than 3.5 mm, preferably less than 1.8 mm.

Further, according to the invention, said method can provide that during said step b) and/or said step c) the thickness of said optical layer is reduced in order to be less than 3 mm, preferably less than 1.4 mm.

Preferably, according to the invention, said method can provide, after step b) or after step c) the following step:

d) further working said first surface of one of said optical layers.

Particularly, according to the invention, said method can provide, before step a), the following steps:

e) working on a first surface of a first starting optical layer obtaining said first surface of said first optical layer;

f) working on a first surface of a second starting optical layer obtaining said first surface of said second optical layer;

and can provide after steps e) and f) the following step:

g) integrally coupling said first and second starting optical layers in correspondence of the respective worked surfaces interposing said third layer between them.

Furthermore, according to the invention, during each of said steps b) and/or c) and/or d) and/or e) and/or f) said surfaces can be worked by means of grinding machines or lapping machines or polishing machines.

Preferably, according to the invention, each of said steps b) and/or c) and/or d) and/or e) and/or f) is repeated in order to work each surface once by grinding, once by lapping and three times by polishing.

Finally, according to the invention, said optical layers can be made of glass.

Furthermore, the present invention relates to a lens comprising a first optical layer, a second optical layer and a third layer interposed between said first and second optical layers, said layers being integrally coupled, said lens being characterized in that said second optical layer has a thickness less than 0.5 mm.

Particularly, according to the invention, said optical layers can be made of glass.

Still according to the invention, said second optical layer can have a thickness comprised between 0.1 mm and 0.5 mm, preferably of 0.3 mm.

Preferably, according to the invention, said lens can have a total thickness less than 3.5 mm, preferably less than 1.8 mm.

Always according to the invention, said first optical layer can have a thickness comprised between 1 mm and 3 mm, preferably of 1.4 mm.

Furthermore according to the invention, said third layer can be a polarized film and/or a photochromic film and/or an impact-resistant film.

Still according to the invention, at least one of said optical layers can be colored, and photochromic, have a UV-protection, IR-protection and/or can comprise Rare-Earths-Elements.

Finally according to the invention, each optical layer can be a spherical lens, preferably each optical layer can have a concave side and a convex side.

The invention will be now described, for illustrative but not limitative purposes, with particular reference to the figures of the enclosed drawings, wherein.

Figure 1:
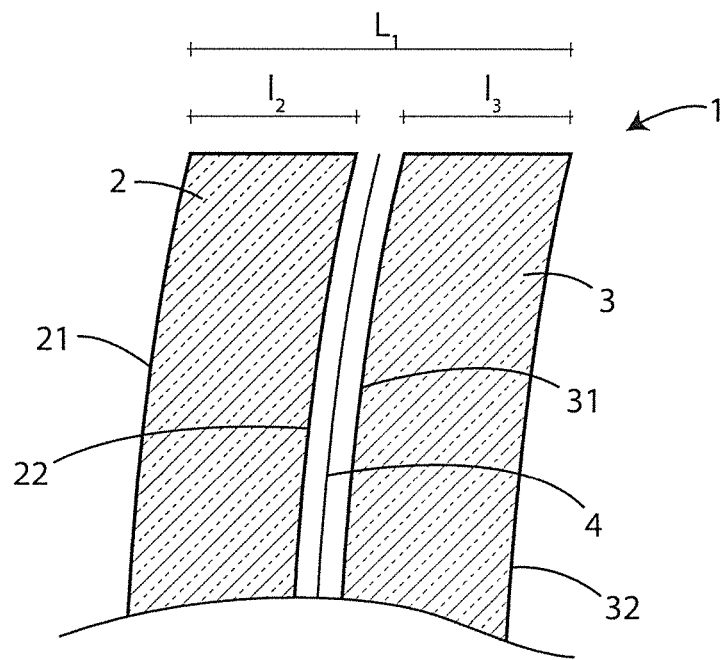
FIG. 1 shows a partial section view of a thin lens according to the prior art.

The present invention is included within the field of polarized glass thin lenses. According to the state of the art, as can be noted seen from FIG. 1, a thin lens 1 has two polarized optical layers 2 and 3 and an intermediate layer 4 interposed between said optical layers 2 and 3, said layers 2, 3, 4 being integrally coupled each other. Said optical layers 2 and 3 are glass spherical lenses, or caps, having opposed surfaces 21, 22 and 31, 32 with respective curvature radiuses. Particularly, in FIG. 1 there are represented convex-concave type lens. The intermediate layer 3 is a polarized film.

Lens 1, since it is thin, generally presents an overall thickness $L_1$ substantially of 1.7 mm and each optical layer 2 and 3 a thickness $l_2$, $l_3$ equivalent to about 0.85 mm. This lens 1 has however the problems and the defects described in the above.

Figure 2:
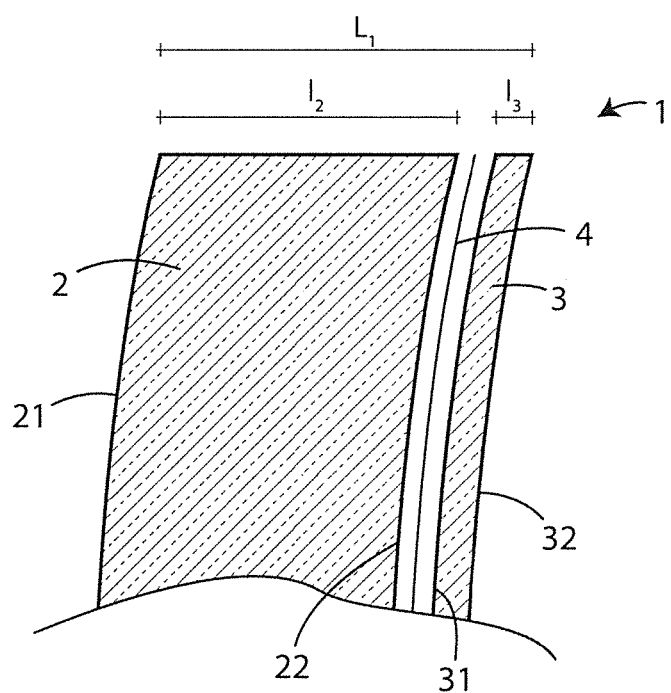
FIG. 2 shows a partial view in section of a thin lens according to the invention.

Observing FIG. 2, it is represented, and indicated with the same numerical references of the prior art lens, a thin lens 1 according to the invention.

Said thin lens 1 according to the invention is characterized by comprising the optical layers 2 and 3, having asymmetric thicknesses, in particular the second optical layer 3 having a thickness $l_3$ less than 0.5 mm, in the embodiment shown equal to 0.3 mm. The first optical layer 4 can instead have any thickness $l_2$, for example less than 3 mm, preferably between 1 and 3 mm, in the specific case equivalent to about 1.4 mm. This allows to overall obtaining a very thin lens, for example at least less than 3.5 mm, preferably less than 1.8 mm, in the specific case substantially equivalent to 1.7 mm.

Such a lens brilliantly solves all the problems already listed and discussed maintaining an extremely thin overall thickness.

Particularly, the mechanical problem and the problem of overcoming the DBT test resistance are advantageously solved since the first optical layer 2, of greater thickness, gives to the whole lens 1 a greater mechanical resistance.

In addition, also the problems related to the total optical thickness of the thin lens are solved, since preferably the first optical layer, that is equipped with the additional features, for example, is capable of conferring the color to the lens and/or the transmission, and/or photochromic, and/or UV protection and/or IR and/or comprises Rare Earth.

This allows, not necessarily, to the second optical layer 3 to be colorless and without particular optical or physical characteristics.

The process according to the invention for the realization of the above thin lenses is equally innovative and provides that the working step and the thickness reduction of the second optical layer 3 takes place only after that the optical layers 2 and 3 have been coupled together, for example by gluing, with the intermediate layer 4 interposed between them.

Specifically, the method provides
a) taking a lens comprising a first optical layer 2, having a first surface 21 and a second surface 22 opposite the first one 21, a second optical layer 3, having a first surface 32 and a second surface 31 opposite the first end 32, and a third layer 4 interposed between the first 2 and second 3 optical layers at the respective second surfaces 22, 31, said layers 2, 3, and 4 being integrally coupled together;
b) working the first surface 32 of the second optical layer 3 to reduce the thickness, in particular of a thickness $l_3$ lower than 0.5 mm, preferably lower than 0.3 mm.

Possibly, after step b) it can be also be provided the following step:
c) working the first surface 21 of the second optical layer 2 to reduce the thickness, in particular a thickness $l_2$ lower than 3 mm, preferably between 1 and 3 mm.

Step a) then provides to be able to take a lens in which the optical layers have been already assembled each other with the intermediate layer, for example a lens among those already present on the market.

Figure 3:
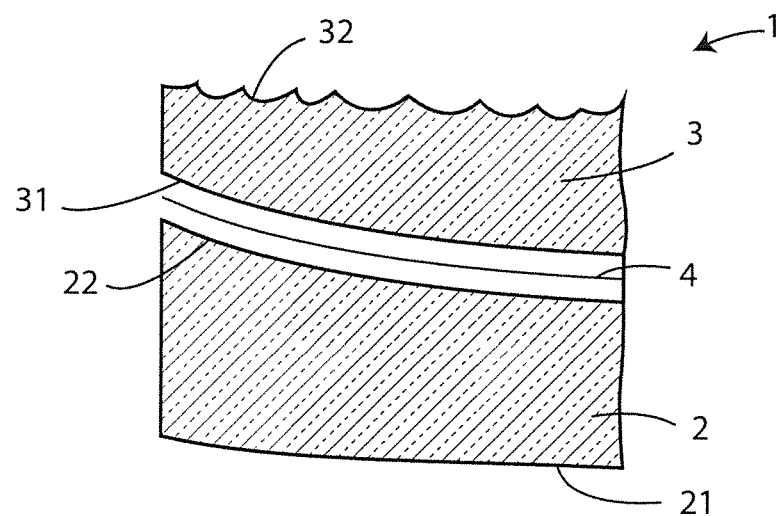
FIG. 3 shows a partial view in section of a thin lens during a step of the manufacturing method of the thin lens according to the invention.
Figure 4:
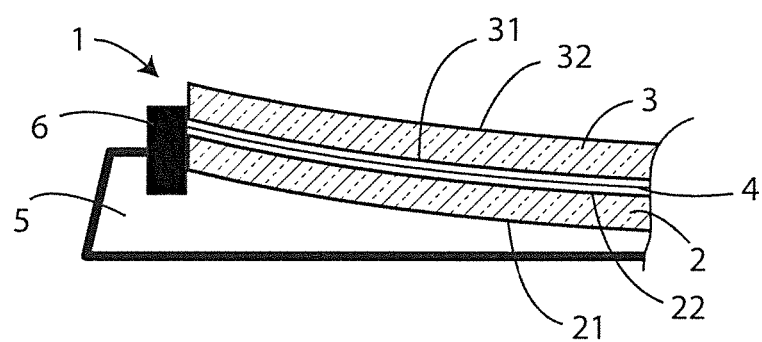
FIG. 4 shows a partial view in section of a thin lens during a further step of the method according to the invention.

The method according to the invention can also provide for the earlier steps of working the optical layers in the raw or initial state providing, before the above step a), the following steps:
e) working the blank or the first surface of the first raw optical layer, in particular a glass block, obtaining said first surface 22, specifically the concave or cc surface, of the outer lens or first optical layer 2;

f) working the blank or the first surface of the second raw optical layer, in particular a glass block, obtaining said first surface 31, specifically the convex or cx surface, of the inner lens or second optical layer 3 (in FIGS. 3 and 4 there are shown two working steps of the concave surface 32 of the second optical layer 3);

g) integrally coupling, particularly gluing, said first and second initial optical layers in correspondence of the respective worked surfaces 21, 32, interposing said third layer 4, particularly the polarized film 4.

In the described steps concerning the working of the surfaces of optical layers, a grinding machine, or a lapping machine or a polishing machine are alternately used.

Preferably, said steps are repeated for each working on each surface and in particular once for the grinding, once for the lapping and three times for the polishing.

With reference to the handling of the optical layers in case of the second optical layer 3, the movements on the machines are made so that only one of the surfaces at a time is worked, by employing the SCARA type robot.

The method according to the invention allows working the second optical layer 2 in order to significantly reduce the thickness, and the lens 1 is not deformed during working. This is permitted in particular by the fact that the second optical layer 3 is rigidly held in position by integral coupling with the first optical layer 2 having a greater thickness.

The method according to the invention allows obtaining a very thin and lightweight lens, reducing the total weight to levels never obtained by a glass polarized lens, but at the same time having a thickness sufficient to withstand the DBT.

Also, the lens according to the invention, even if very thin, has a thickness sufficient to appreciate the photochromic or to take advantage of all the optical benefits of a lens with Rare Earths (RE), or for the UV and IR protection.

In addition, the thinnest optical layer of the lens according to the invention protects the polarized film with the usual resistance to scratches in the glass of the lenses, it is light and optically perfect.

The lens thus obtained has an optical precision never reached before; in fact, if subjected to the NBS definition test 374 reaches the level of 68 lines, thanks to the fact that the final surfaces are worked simultaneously and therefore devoid of prismatic defects, aberrations, residual power, etc.

It is not excluded that the material of the optical layers is different from the glass, for example polymeric material or other materials.

Further, the third intermediate layer may not necessarily be a polarized film, but, for example, can be a film able to confer greater resistance to impact to the lens or a photochromic film.

In the foregoing preferred embodiments have been described and variants of the present invention have been suggested, but it is to be understood that one skilled in the art can introduce modifications and changes, without departing from the relevant scope, as defined by the enclosed claims.

The invention claimed is:

1. A method for making a thin lens (1) having an overall thickness of 1.8 mm or less, said method comprising the following steps:
taking a lens comprising:
a first optical layer (2) made of glass, having a first surface (21) and a second surface (22) opposite to the first surface (21),
a second optical layer (3) made of glass and having a first surface (32) and a second surface (31) opposite to the first surface (32), and
a third layer (4) interposed between the first optical layer (2) and the second optical layer (3) in correspondence of the respective second surfaces (22, 31), wherein said layers (2, 3, 4) are integrally coupled among each other; and
working the first surface (32) of the second optical layer (3) for reducing its thickness in order to be less than 0.5 mm.

2. The method according to claim 1, further providing before or after the step of the working the first surface (32) of the second optical layer (3) the following step:
working said first surface (21) of said first optical layer (2) for reducing its thickness in order to be 1.4 mm or less.

3. The method according to claim 2, further comprising providing after the step of working the first surface (32) of the second optical layer (3) the following step:
further working said first surface (21, 32) of one of the first optical layer and the second optical layer (3).

4. The method according to claim 1, further comprising providing, before the step of taking a lens, the following steps:
working on a first surface of a first starting optical layer obtaining said first surface (22) of said first optical layer (2);
working on a first surface of a second starting optical layer obtaining said first surface (31) of said second optical layer (3);
in providing after steps e) and f) the following step:
integrally coupling said first and second starting optical layers in correspondence of the respective worked surfaces (21, 32) interposing said third layer (4) between them.

5. The method according to claim 4, wherein during a performance of the steps of the method said surfaces (21, 22, 31, 32) are worked by grinding machines or lapping machines or polishing machines.

6. The method according to claim 5, wherein at least one of the steps of the method repeated in order to work each of the first and second surfaces (21, 22, 31, 32) by grinding, by lapping and three times by polishing.

7. A lens (I) comprising:
a first optical layer (2) made of glass,
a second optical layer (3) made of glass, and
a third layer (4) interposed between said the first optical layer (2) and the second optical layer (3),
wherein said first, second and third layers (2, 3, 4) are integrally coupled;
wherein said lens (1) has an overall thickness of 1.8 mm or less ram;
wherein said second optical layer (3) has a thickness less than 0.5 mm;
wherein said first optical layer (2) has a thickness of 1.4 mm or less.

8. The lens (1) according to claim 7, wherein a thickness of said second optical layer (3) is between 0.1 mm and 0.5 mm.

9. The lens (1) according to claim 7, wherein a thickness of said first optical layer (2) is between 1 mm and 3 mm.

10. The lens (1) according to claim 7, wherein said third layer (4) is at least one of a polarized film, a photochromic film, and an impact-resistant film.

11. The lens (1) according to claim 7, wherein at least one (2) of said optical layers (2, 3) comprises rare earths elements.

12. The lens (1) according to claim 7, wherein each optical layer (2, 3) is a spherical lens, wherein each of the first optical layer (2) and the second optical layer (3) has a concave side (22, 32) and a convex side (21, 31).

13. The method according to claim 1, wherein during the step of the working the first surface (32) of the second optical layer (3) the thickness of the second optical layer (3) is reduced in order to be 0.3 mm or lower.

14. The lens according to claim 7, wherein the thickness of said second optical layer (3) is of 0.3 mm or lower.

15. The method according to claim 1, wherein, following the working steps, the lens has an optical resolving power as great as 68 lines when subjected to NBS definition test 374.

16. The lens according to claim 7, wherein the lens has an optical resolving power as great as 68 lines when subjected to NBS definition test 374.

17. The lens according to claim 7, wherein at least one of said optical layers is colored, is photochromic, or has at least one of a UV protection or an IR protection.

\* \* \* \* \*